(12) United States Patent
Nakano et al.

(10) Patent No.: US 8,878,061 B2
(45) Date of Patent: Nov. 4, 2014

(54) POSITIONER AND COMPOSITE CURL CORD

(75) Inventors: Mitsuyoshi Nakano, Kitayushu (JP); Masaaki Hara, Kitakyushu (JP); Takayuki Imanaka, Kitakyushu (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 962 days.

(21) Appl. No.: 13/008,062

(22) Filed: Jan. 18, 2011

(65) Prior Publication Data

US 2011/0108305 A1 May 12, 2011

Related U.S. Application Data

(62) Division of application No. 11/630,623, filed as application No. PCT/JP2005/009375 on May 23, 2005, now Pat. No. 7,905,472.

(30) Foreign Application Priority Data

Jun. 25, 2004 (JP) ................. 2004-187553

(51) Int. Cl.
*H01B 7/06* (2006.01)
*H01B 7/00* (2006.01)
*B25J 19/00* (2006.01)
*H02G 11/00* (2006.01)

(52) U.S. Cl.
CPC ............. *B25J 19/0029* (2013.01); *H02G 11/00* (2013.01)
USPC ............................................. 174/69; 174/47

(58) Field of Classification Search
CPC ........ H01B 7/0072; H01B 7/06; H01B 7/065; A47L 9/24; A47L 9/246; H02G 11/00
USPC ....................................................... 174/47, 69
See application file for complete search history.

(56) References Cited

U.S. PATENT DOCUMENTS 4,462,579 A 7/1984 Satake
4,522,113 A * 6/1985 Tsuno ............................. 92/113
(Continued)

FOREIGN PATENT DOCUMENTS

DE 39 29 139 A1 3/1991
EP 0 979 705 A2 2/2000
(Continued)

OTHER PUBLICATIONS

Office Action dated Apr. 24, 2013 issued by the German Patent Office in corresponding German Application No. 11 2005 001 432.0 Y.

*Primary Examiner* — Timothy Thompson
*Assistant Examiner* — Sherman Ng
(74) *Attorney, Agent, or Firm* — Sughrue Mion, PLLC

(57) ABSTRACT

In a positioner according to the present invention, the rotating table and a hollow shaft is rotated by a motor via a speed reduction gear. In such a configuration, an air tube and a cable which supplies the air or electric power used to operate a jib on the rotating table are provided via the rotary joint arranged at one end of the shaft. A communication device may be provided on the rotating table by detaching the rotary joint and arranging a composite curl cord. The communication device may be provided by the rotary joint and a wireless communication device without using the composite curl cord.

2 Claims, 3 Drawing Sheets

(56) References Cited

U.S. PATENT DOCUMENTS

| | | | |
|---|---|---|---|
| 4,568,070 A | 2/1986 | Severt | |
| 4,702,281 A * | 10/1987 | Moritz | 138/120 |
| 5,307,676 A | 5/1994 | Gutman | |
| 5,384,431 A * | 1/1995 | Tusques | 174/117 F |
| 5,660,742 A * | 8/1997 | Warner et al. | 219/85.16 |
| 5,676,360 A | 10/1997 | Boucher et al. | |
| 6,332,604 B1 | 12/2001 | Chu | |
| 6,930,244 B1 * | 8/2005 | Nebel | 174/486 |
| 7,491,022 B2 | 2/2009 | Kato et al. | |
| 2002/0068992 A1 | 6/2002 | Hine et al. | |
| 2004/0170363 A1 * | 9/2004 | Angela | 385/100 |
| 2007/0031232 A1 * | 2/2007 | Kurebayashi et al. | 414/682 |
| 2009/0200722 A1 | 8/2009 | Nakano et al. | |

FOREIGN PATENT DOCUMENTS

| | | |
|---|---|---|
| JP | 61-103681 A | 5/1986 |
| JP | 6-338224 A | 12/1994 |
| JP | 8-276392 A | 10/1996 |
| JP | 11-28691 A | 2/1999 |
| JP | 3019068 B2 | 1/2000 |

* cited by examiner

POSITIONER AND COMPOSITE CURL CORD

TECHNICAL FIELD

The present invention relates to a positioner which changes a placing direction of a processing object in order to facilitate processing when performing such as welding, cutting, etc. with an industrial robot, and further relates to a composite curl cord adapted to be used in the positioner.

BACKGROUND ART

A conventional positioner is constructed as shown in FIG. 5 (see, e.g., Patent Document 1).

In the figure, 512 designates an electrically conductive rotating table which fixes and rotates a welding object or a jig 501. 502 designates an electrically conductive hollow shaft which is press-fitted and fixed to the center of the rotating table 512. 503 designates an electrically conductive ring of a donut disk shape which is fixed to the other end of the hollow shaft 502. 504 designates a carbon brush which comes in contact with the ring 503 from below. 505 designates a cable connected to the carbon brush 504. The cable 505 is for sending a welding electric current to an external welding electric power source. 506 designates a first pulley fixed to the hollow shaft 502. 507 designates a second pulley connected to a motor 508. 509 designates a timing belt which links the first pulley 506 and the second pulley 507. 510 designates an external mounting case. 511 designates an air tube or a cable.

In the conventional positioner, the hollow shaft 502 is driven by the motor 508 via the timing belt 509 and the pulleys 506, 507, thereby rotating the rotating table 512. In such a configuration, the air tube or the cable 511, which supplies air or electric power used in driving the jig 501 on the table, is set on the rotating table 512 by being led through the interior of the hollow shaft 502 from a bottom portion of a positioner. The welding electric current flows from the rotating table 512 to the exterior through the carbon brush 504.
Patent Document 1: Japanese patent No. 3019068

DISCLOSURE OF THE INVENTION

Problems that the Invention is to Solve

In the conventional positioner, a work for leading the air tube or the signal cable 511 through the long hollow shaft 502 is required when installing a main body of the positioner. And after the work, when it is used with the air tube or the cable 511 being in contact with the hollow shaft, there is a high risk of damaging the air tube or the cable 511.

In order to supply air or to transmit signals, for example, to the jig 501 on the rotating table 512, a rotary joint may be considered to be applied. However, periodic maintenance is required due to operation life of the rotary joint, and therefore, improving a maintenance property is a big issue.

Further, even if the rotary joint is applied, the rotary joint itself cannot stably hold specific electric impedance. Therefore, it is difficult to utilize a field network such as Device Net and CC-Link (registered trademark).

The present invention is made in consideration of such problems, and it is an object of the present invention to provide a positioner having an excellent maintenance property, in which a work for leading cables through a hollow shaft is not required when installing a main body of the positioner, and in which the rotary joint can be easily attached or detached. Another object of the present invention is to provide a positioner in which a communication device for devices such as a jig on a rotating table can be provided, in each of the cases where the rotary joint is detached and where the rotary joint is attached.

Means for Solving the Problems

In order to solve the above problems, the present invention is configured as follows.

A positioner described in claim 1 includes: driving means attached to a frame; a speed reduction gear attached to the driving means; a hollow shaft driven via the speed reduction gear; a rotating table having a rotation center attached to one end of the hollow shaft; and a rotary joint arranged at the other end of the hollow shaft.

A positioner described in claim 2 includes: driving means attached to a frame; a speed reduction gear attached to the driving means; a hollow shaft driven via the speed reduction gear; a rotating table having a rotation center attached to one end of the hollow shaft; and a composite curl cord wired inside the hollow shaft, wherein the composite curl cord is winded in a coil shape, and includes an air tube, a cable for an IO signal and electric power, and a movable cable for communication that are bonded together such that cores thereof are parallel to each other.

In the positioner described in claim 3, the composite curl cord as set forth in claim 2 is applied with torsion in advance in a direction of reducing a winding diameter of the composite curl cord, and the composite curl cord is attached in a state in which a winding number thereof is increased.

A positioner described in claim 4 includes: driving means attached to a frame; a speed reduction gear attached to the driving means; a hollow shaft driven via the speed reduction gear; a rotating table attached to one end of the hollow shaft; a rotary joint attached to the other end of the hollow shaft; and a wireless communication device fixed to the rotating table.

In the positioner described in claim 5, the wireless communication device as set forth in claim 4 is fixed to a lower face of the rotating table or inside the rotating table.

A composite curl cord described in claim 6 includes: a movable cable for communication in which characteristic impedance thereof is stably held; a cable for an IO signal and electric power which is bonded with the movable cable for communication such that core directions thereof are parallel to each other; and an air tube banded which is bonded with the movable cable such that core directions thereof are parallel to each other, wherein the composite curl cord is winded in a coil shape.

In the invention described in claim 7, a winding inside diameter of the composite curl cord as set forth in claim 6 is 2.5 times or less with respect to a largest sectional diameter among sectional diameters of the air tube, the cable for an IO signal and electric power, and the movable cable for communication.

Effect of the Invention

According to the positioner described in claim 1, since the rotary joint is arranged at the end portion of the hollow shaft, the rotary joint can be easily attached and detached, and it is excellent in maintenance property. Further, an installing work property is improved since no work for leading cables through the hollow shaft is required when installing.

According to the positioner described in claim 2, the rotary joint is detached, and the composite curl cord including the air tube, the curl cord and the cable having characteristic impedance stably held in a predetermined specification is arranged. Accordingly, communication can be performed in addition to the conventional air supply and IO signal input and output. Further, the installing work property is improved since no work for leading the cables through the hollow shaft is required when installing.

According to the positioner described in claim 3, portion is applied to the composite curl cord in advance in a direction of reducing a winding diameter when assembling, and the curl cord is wired within the hollow shaft in a state in which a winding number thereof is increased. Accordingly, even when the rotating table is rotated in a direction of increasing the winding diameter of the composite curl cord, the wiring can be performed in a stable state without coming in contact with an inside diameter face of the hollow shaft.

According to the positioner described in claim 4, when the rotary joint is attached, only electric power and the air are supplied to a wireless communication device, and a jig, etc. arranged on the rotating table via the rotary joint. Accordingly, communication can be performed by the wireless communication device, and a communication cables are omitted. As a result, the possibility of disconnection of the cable is reduced so that reliability is improved. Further, the installing work property is improved since no work for leading the cables through the hollow shaft is required when installing.

According to the positioner described in claim 5, the wireless communication device is arranged so as to be embedded on the lower face of the rotating table, or inside the rotating table, and does not become an obstacle of a jig arrangement on the rotating table. Accordingly, an area on the rotating table can be effectively used.

According to the composite curl cord described in claim 6, air tubes, cables for an IO signal and electric power and movable cables for communication having characteristic impedances stably held are bonded together such that respective cores are parallel to each other. The composite curl cord is winded in a coil shape. Therefore, means for the air supply, the IO signal, electric power and communication can be provided to a movable device by a single wiring.

According to the composite curl cord described in claim 7, the winding inside diameter thereof is 2.5 times or less with respect to a largest sectional diameter among the sectional diameters of the cable for an IO signal and electric power and the above movable cable for communication. Therefore, it is excellent in space saving property in comparison with the conventional coil cable.

Figure 1:
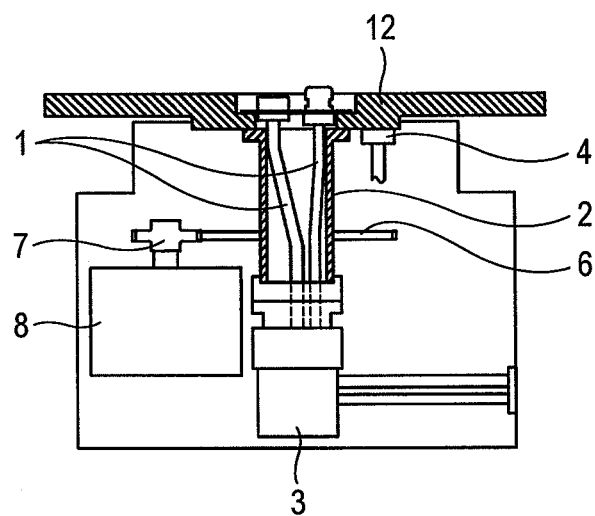
FIG. 1 is a side sectional view of a positioner showing a first embodiment of the present invention.

DESCRIPTION OF THE REFERENCE NUMERALS AND SIGNS 1 air tube and cable
2 hollow shaft
3 rotary joint
4 brush
6 first gear
7 second gear
8 motor
12 rotating table
201 composite curl cord
301 air tube
302 cable for an IO signal and electric power
303 DeviceNet cable
401 connector
402 wireless communication device
403 electric power source cable
405 air tube
501 jig
502 hollow shaft
503 electrically conductive ring
504 carbon brush
505 cable
506 first pulley
507 second pulley
508 motor
509 timing belt
510 external mounting case
511 air tube or cable
512 rotating table

BEST MODE FOR CARRYING OUT THE INVENTION

Embodiments of the present invention will be explained below with reference to the drawings.

Embodiment 1

FIG. 1 is a side sectional view of a positioner showing a first embodiment of the invention. In the figure, 12 designates an electrically conductive rotating table which fixes a welding object or a jig. 2 designates a hollow shaft which is fixed to a rotation center of the rotating table 12 and is rotatably supported by an unillustrated frame. 3 designates a rotary joint fixed to an end portion of the hollow shaft 2. 6 designates a first gear fixed to the hollow shaft 2, and constitutes a speed reduction gear together with a second gear 7 fixed to a motor 8 fixed to the unillustrated frame. 4 designates a brush for flowing a welding electric current. The brush 4 is constantly in contact with the rotating table 12 by an unillustrated spring, and a cable is connected thereto. 1 designates an air tube and a cable.

The first embodiment of the present invention is different from the Patent Document 1 in that the brush 4 is provided so as to be in contact with the rotating table 12 by the unillustrated spring in order to flow a welding electric current, and in that the rotary joint 3 is provided for supplying air, inputting/outputting an IO signal and supplying electric power.

Next, an operation of the positioner will be explained. In the positioner according to the first embodiment of the present invention, the hollow shaft 2 is driven by the motor 8 via the speed reduction gear, thereby rotating the rotating table 12. In such a configuration, the air, the IO signal input and output, and electric power used in the operation of a jig, etc. on the rotating table are provided from a panel disposed on a side face of the positioner via the rotary joint 3.

As mentioned above, according to the first embodiment, it is sufficient to merely connect cables to the panel at the side face of the positioner when installing a main body of the positioner. Therefore, no work for leading the cables through the hollow shaft 2 is required. Further, since the rotary joint 3 is arranged at an end portion of the hollow shaft 2, the rotary joint 3 can be easily attached and detached, thereby providing an excellent maintenance property.

Embodiment 2

Figure 2:
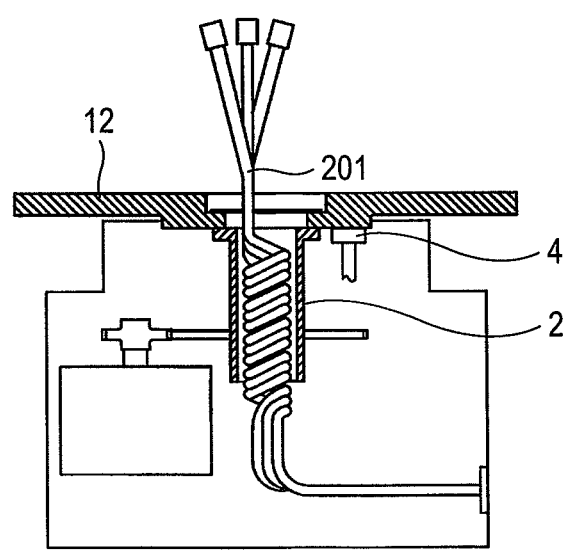
FIG. 2 is a side sectional view of a positioner showing a second embodiment of the present invention.

FIG. 2 is a side sectional view of a positioner showing a second embodiment. 201 designates a composite curl cord. One end of the composite curl cord 201 is connected to the panel at the side face of the positioner, and is fixed to an unillustrated frame. The other end of the composite curl cord 201 is wired on the rotating table after being led through the interior of the hollow shaft 2. The other constructions are similar to those of FIG. 1, and their explanations are therefore omitted.

The second embodiment of the present invention is different from the Patent Document 1 in that the brush 4 is provided so as to be in contact with the rotating table 12 by a spring in order to flow a welding electric current, and in that the composite curl cord 201 is provided for air supply, IO signal input and output, electric power and communication.

The rotating operation of the rotating table 12 is similar to that of the first embodiment, and its explanation is therefore omitted. Here, the composite curl cord 201 will be described in the followings.

Figure 3:
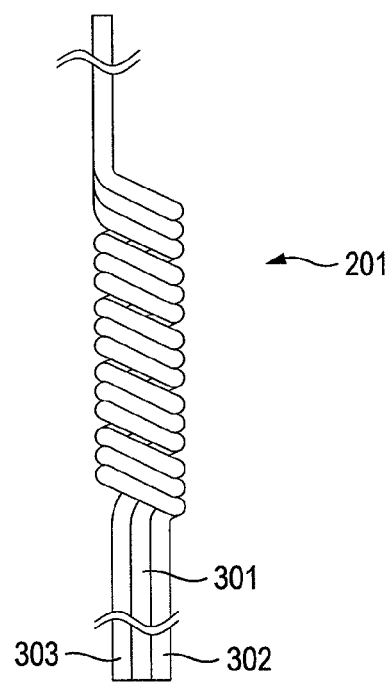
FIG. 3 is an external appearance view of a curl cord applied in the second embodiment.

FIG. 3 is an external appearance view showing the composite curl cord 201 applied in the second embodiment of the present invention. In the figure, 301 designates an air tube, and a raw material thereof is urethane. 302 designates a cable for an IO signal and electric power, and a sheath thereof is a movable multi-core cable made of fluororesin. 303 designates a Device Net cable, and characteristic impedance thereof is stably held with a predetermined specification. A sectional diameter of each cable is set to about $\phi 10$.

In the composite curl cord 201 according to the second embodiment of the present invention, the tube 301, the multi-core cable 302 for an IO signal and electric power, and the Device Net cable 303 are bonded so as to be in parallel to each other, and the composite curl cord is formed in a coil shape. Here, a solvent of an adhesive agent may be cyclohexane.

Generally, when forming a curl cord, an inside diameter of winding is required to be about three times with respect to a sectional diameter of a cable. However, an inside diameter of winding of the composite curl cord 201 according to the second embodiment is about 2.5 times with respect to the sectional diameter of the cable. Thus, an outside diameter of winding is about $\phi 50$ which is smaller than the inside diameter $\phi 60$ of the hollow shaft 2.

When wiring the composite curl cord 201 within the hollow shaft 2, the composite curl cord 201 is provided in a state in which a torsion is applied in advance by an amount of ¼ rotation at a maximum in a direction of reducing the winding diameter, whereby a winding number is increased. Due to such an assembly, a wiring of a stable state can be obtained, in which the composite curl cord 201 does not come in contact with an inside diameter face of the hollow shaft 2 even when the rotating table 12 is rotated in a direction of increasing the winding diameter of the composite curl cord 201.

According to the above configuration, when the rotating table 12 is rotated, the composite curl cord 201 flexibly deforms in response to the rotation although being twisted. Therefore, air supply, signal input and output, electric power supply and communication can be stably performed.

Material of the air tube 301 is not limited to urethane, and Polyurethane, nylon, vinyl chloride, etc. may be arbitrarily used.

Sheath material of the cable 301 for an IO signal and electric power is not limited to fluororesin, and PCV, urethane, vinyl chloride, etc. may be arbitrarily used.

The Device Net cable 303 may be a movable communication cable such as a MECHATROLINK (registered trademark) cable, a CC-Link (registered trademark) cable, an RS-232C cable, GPIB, etc. in accordance with a communication method. The sheath material may be arbitrarily set such as PCV, urethane, vinyl chloride, etc.

Also, an order of arranging the air tube 301 and the cables 302, 303 may be arbitrary.

As mentioned above, according to the second embodiment, cables are connected to the panel at the side face of the positioner when installing the main body of the positioner, and therefore, no work for leading the cables through the hollow shaft 2 is required. Further, the rotary joint 3 is detached, and the composite curl cord 201 including the air tube 301, the cable 302 for an IO signal and electric power, and the Device Net cable 303 is provided. Accordingly, communication can be performed in addition to the conventional air supply and IO signal input and output.

Further, when assembling the composite curl cord 201, torsion is applied to the composite curl cord 201 in advance in a direction of reducing the winding diameter, and the composite curl cord 201 is wired within the hollow shaft 2 in a state in which the winding number is increased. Accordingly, even when the rotating table 12 is rotated in a direction of increasing the winding diameter of the composite curl cord 201, a wiring of a stable state can be obtained, in which the composite curl cord 201 does not come in contact with the inside diameter face of the hollow shaft 2.

Embodiment 3

Figure 4:
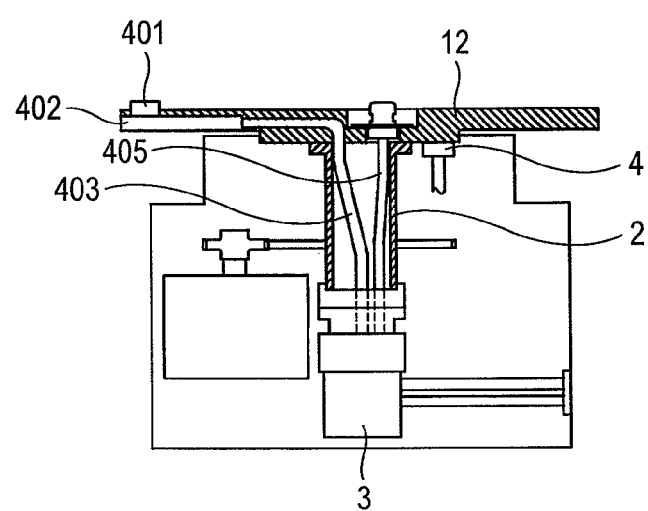
FIG. 4 is a side sectional view of a positioner showing a third embodiment of the present invention.
Figure 5:
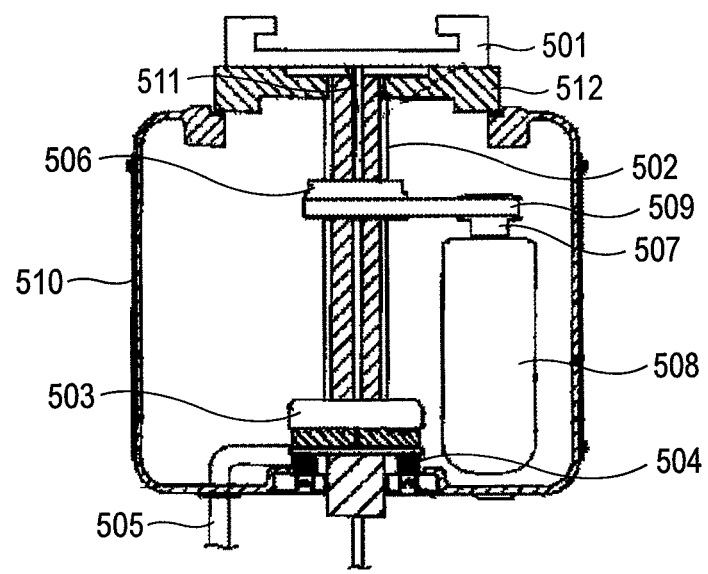
FIG. 5 is a view showing a conventional positioner.

FIG. 4 is a side sectional view of a positioner showing a third embodiment. 403 designates an electric power source cable which is wired via a rotary joint 3. In the figure, 402 designates a wireless communication device connected to the electric power source cable 403. The wireless communicating device 402 is fixed to a lower face of a rotating table 12 in a state of being electrically insulated from the rotating table 12, and a connector 401 is provided thereto. The other constructions are similar to those of FIG. 1, and their explanations are therefore omitted.

The third embodiment of the present invention differs from the Patent Document 1 in that a brush 4 is provided so as to come in contact with the rotating table 12 by a spring in order to flow a welding electric current, and in that the rotary joint 3 for air supply and electric power supply, and the wireless communication device 402 using electric power supplied via the rotary joint 3 are provided.

The rotating operation of the rotating table 12 is similar to that in the first embodiment, and its explanation is therefore omitted.

In FIG. 4, only electric power is supplied to the wireless communication device 402 via the rotary joint 3, and the wireless communication device 402 wirelessly communicates with an external device. The wireless communication device 402 is connected to a device on the rotating table 12 such as a jig via the connector 401.

In the third embodiment, since the wireless communication device 402 is arranged on the lower face of the rotating table 12, it does not become an obstacle of the jig, etc. If the wireless communication device 402 has directivity, there is a restriction in which communication can be performed only in a specific rotating position. However, if the wireless communication device 402 has no directivity, communication can be performed in an arbitrary rotating position.

The wireless communication device 402 utilizes a radio wave, an infrared ray or light, etc., and may be an arbitrary communication device.

An arranging position of the wireless communication device 402 may be arbitrarily set unless the arranging position is a place where the wireless communication is obstructed. The wireless communication device 402 may be embedded within the rotating table 12. With respect to the connector 401, it is not necessary to be integrated with the wireless communication device 401, and it is preferable to be arranged in a position where an arrangement of a device such as a jig, etc. is not obstructed.

Means for communication with a device such as a jig, etc. may be arbitrarily, but serial communication of daisy chain connection may be preferable.

As mentioned above, in accordance with the third embodiment, cables are connected to the panel at a side face of the positioner when installing the main body of the positioner, and therefore, no work for leading the cables through the hollow shaft 2 is required, whereby an installing work property is improved. Further, only electric power and the air are supplied from the panel to the wireless communication device 402 and the jig, etc. arranged on the rotating table 12 via the rotary joint 3. Accordingly, communication can be performed by the wireless communication device 402.

Since the wireless communication device 402 is embedded in the rotating table 12, a device such as a jig, etc. arranged on the rotating table 12 is not obstructed, whereby an area on the rotating table can be effectively used.

INDUSTRIAL APPLICABILITY

The composite curl cord according to the present invention is not limited to a positioner, but can be also applied to general devices in which an air supply, IO signal input and output, and communication device are required for movable portions such as a robot, a movable stage, etc.

The invention claimed is:

1. A composite curl cord comprising:
   a movable cable for communication in which characteristic impedance thereof is stably held;
   a cable for an IO signal and electric power which is bonded with the movable cable for communication such that core directions thereof are parallel to each other; and
   an air tube banded which is bonded with the movable cable such that core directions thereof are parallel to each other,
   wherein the composite curl cord is winded in a coil shape while being applied with torsion in advance in a direction of reducing a winding diameter of the composite curl cord.

2. The composite curl cord according to claim 1, wherein a winding inside diameter of the composite curl cord is 2.5 times or less with respect to a largest sectional diameter among sectional diameters of the air tube, the cable for an IO signal and electric power, and the movable cable for communication.

* * * * *